Patented Dec. 17, 1929

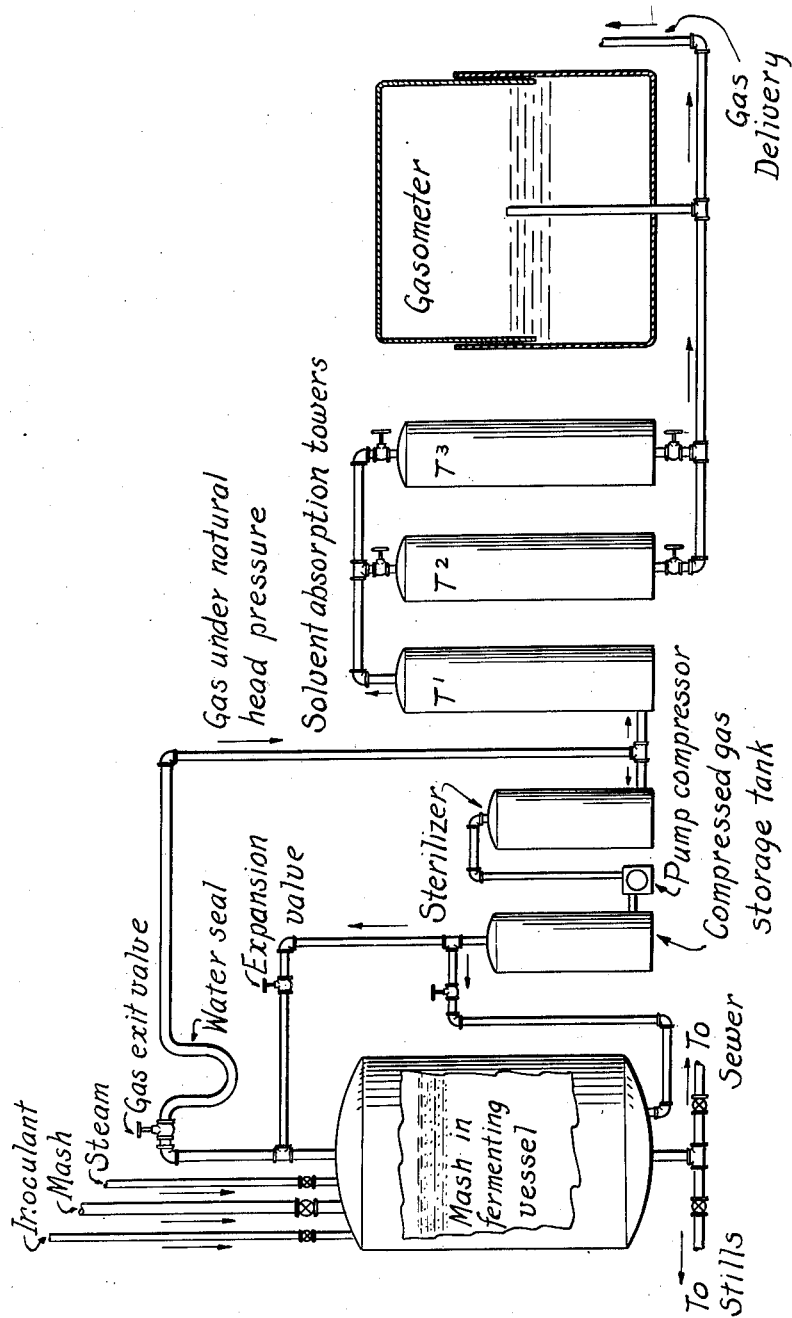

1,740,162

UNITED STATES PATENT OFFICE

WILLIAM J. EDMONDS, OF BAYTOWN, TEXAS, ASSIGNOR TO COMMERCIAL SOLVENTS CORPORATION, OF TERRE HAUTE, INDIANA, A CORPORATION OF MARYLAND

BUTYL ACETONIC FERMENTATION PROCESS

Application filed April 3, 1926, Serial No. 99,565. Renewed May 24, 1929.

My invention relates to an improved process for the butyl-acetonic fermentation and is characterized by a series of steps which permits the recovery of the by-product fermentation gases in such a manner as to allow their economic utilization in pure form.

Briefly, my invention contemplates the operation of the butyl-acetonic fermentation process in such a manner that air is not admitted to any stage of the process, so that dilution of the fermenter gases with oxygen and nitrogen is avoided.

The hereinafter described apparatus forms the subject matter of my copending application Serial Number 99,566, filed April 3, 1926.

The fermentation of carbohydrates by butyl-acetonic bacilli is a large industry, and as a by-product, there is produced an immense volume of "fermenter gas" which consists of a mixture of hydrogen and carbon dioxide.

The art of butyl-acetonic fermentation is well described in the literature and in a number of patents, notably U. S. Patents 1,315,585; 1,329,214; 1,385,888; 1,427,595; 1,538,516; etc. When carbohydrates are fermented by the butyl-acetonic fermentation there is obtained per pound of carbohydrate about five cubic feet of "fermenter gas" measured at ordinary temperatures and pressures. The solvents—i. e. butyl alcohol and acetone—remain in the fermented mash and are at the present time, recovered therefrom by distillation.

In the past, however, the "fermenter gas," which may slightly vary in composition but which consists of approximately 45% of hydrogen and 55% of carbon dioxide, by volume, has been simply discharged into the atmosphere and a great economic loss has resulted. The carbon dioxide and hydrogen may be separated by known processes and each gas has many possible industrial applications. There also exists the possibility of using the fermenter gas—per se—or after some carbon dioxide has been removed—for the high pressure catalytic synthesis of methanol, formaldehyde, and other organic compounds.

In the past, the industrial utilization of "fermenter gas" has not achieved practical accomplishment and one potent factor that has held back the art has been the fact that it has been deemed impossible to secure fermenter gas free from contamination with air. Fermenter gas containing free oxygen cannot be economically utilized, nor can hydrogen or carbon dioxide be obtained therefrom in pure form except by expensive refrigeration methods. The presence of oxygen and nitrogen renders carbon dioxide unfit for many uses and hydrogen containing oxygen cannot be employed in hydrogenation processes.

The fermentation of carbohydrate mashes in the great fermenting vessels used in the industry according to past practices has inevitably resulted in the contamination of fermenter gas with air. It is true that during active fermentation so much fermenter gas is generated that any air present in the vessels or pipe lines is swept out and pure fermenter gas will issue from the vats. However there is a large loss of valuable gas in this "sweeping out" process and it is this loss that my improved process prevents. Under present procedure when a fermenting vessel is emptied of mash it is inevitable that air is introduced into the vessel, and my improved process avoids this loss also.

As will be apparent from the example given below, my invention is applicable to any butyl-acetonic fermentation process, quite regardless of the specific bacilli or apparatus employed.

One method of operating my process of butyl-acetonic fermentation may be briefly described with reference to the accompanying flow-sheet drawing:—

In the fermenting vessel a carbohydrate mash, previously introduced through a suitable mash line, has been inoculated with butyl-acetonic bacilli, and is in the process of fermentation. As the result of this fermentation there is an evolution of fermenter gas, saturated with water vapor and containing volatile solvent vapors. This gas rises in the head of the fermenting vessel and passes out through the "gas exit valve" at a pressure of about three pounds above atmospheric, this exit pressure being regulated by valve adjustment. From the exit valve the gas passes through an ordinary water seal, downward, and enters the solvent absorption system at the bottom of the tower marked T'.

The gas then passes through one or more other solvent absorption towers indicated on the drawing as T² and T³. The exact nature of the solvent absorption system is immaterial to the present process.

In practice, T', consists of a tower filled with loose packing through which the gas rises to the top, being partially scrubbed free from solvents by a stream of water flowing downward over the packing. The stream of water is maintained by a pump operating from a sump, neither of these devices being shown on the drawing. The solvents dissolved in the scrubbing water may be recovered by the usual distillation methods which are employed for the recovery of the solvents in the fermented mash.

From the top of T', the gas is passed through either T² or T³ or through both of these towers and hence on into the gasometer. Towers T² and T³ may contain a solid absorption media such as charcoal or silica gel, contact with this solid absorbent being designed to remove the last traces of valuable solvent vapor from the gas. These towers may be used alternately or in tandem but it is advisable to use one tower for absorption while removing the absorbed solvent from the other tower by the application of heat or steam.

In place of the of the above described solvent recovery system many other schemes may be employed. The number of towers may be increased or decreased. All solvent recovery may be accomplished by absorption in solid media without water-scrubbing or vice versa. In place of water-scrubing or solid absorbent solvent recovery other schemes may be employed—for example solvent removal may be accomplished by scrubbing the gases with heavy oils or the like.

From the solvent absorption system the fermenter gas passes into the gasometer under its natural head pressure. For example if the gas is evolved from the fermenting vessel at three pounds pressure, the solvent absorption system will reduce this pressure so that the head pressure of the gas entering the gasometer will be reduced to about one-half pound above atmospheric pressure.

On the drawing there is shown a side connection by which fermenter gas may be tapped or led off from the pipe supplying the solvent absorption system and supplied to the sterilizer shown on the drawing. This sterilizer which is not shown in cross-section has the function of sterilizing the gas passed through it to destroy any bacilli which might be entrained therein. Such sterilizers are well known in the art and may take any one of a number of forms. For example the sterilizer may consist of a vat containing an antiseptic solution through which the gas is bubbled—a plate and boiling cap device sometimes being used to secure complete entrainment. Or the sterilizer may consist simply of a vessel through which the gas passes in intimate contact with rays of ultra-violet light. Likewise sterilization may be attained by merely heating the gas in a suitable vessel during its passage through the sterilizer.

The fermenter gas is sucked through the sterilizer by the pump-compressor shown on the drawing and during the passage of the gas through the pump-compressor it is compressed to a pressure substantially above atmospheric—say 20 pounds—and is stored in the compressed gas storage tank shown on the drawing. This compression of gas need not occur continuously. The object of the action is merely to assure an adequate supply of compressed gas in the storage tank. The maintenance of this supply may, if desired, be automatically provided for by means of a pressure gauge on the storage tank which may actuate the pump-compressor by means of suitable electrical connections, starting the pump whenever the pressure drops below a certain minimum, and stopping the pump-compressor whenever the pressure in the storage tank has been built up to the desired amount.

In the operation of my process, as long as fermentation continues the evolved gas passes through the water seal into the gasometer as described. When fermentation is complete gassing ceases and the gas exit valve is shut. The mash containing solvents is drained from the fermenting vessel to the stills and as the draining valve is opened the expansion valve shown on the drawing is opened, and compressed fermenter gas enters the top of the fermenting vessel; such gas displacing the fermented mash as it drains out, and preventing any air from leaking in and contaminating the gas in the vessel.

When all of the mash has drained from the fermenting vessel the draining valve is shut and the fermenting vessel is maintained under a pressure of fermenter gas until it is next used. It is frequently necessary to sterilize and clean the fermenting vessels between periods of use. In this case steam is admitted and forced into the atmosphere of fermenter gas in the vessel. After sterilization the condensed water may, if desired, be drawn out of the bottom of the fermenting vessel, the diminution in pressure being cared for by passing in more fermenter gas.

When another charge of mash to be fermented is to be placed in the fermenting vessel, the fermenter gas supply from the compression tank is cut off and the gas exit valve is opened. As the mash enters the fermenting vessel it displaces the gas which passes through the water seal and on into the gasometer.

Thus it is seen that by means of my process it is possible to operate the butyl-acetonic fermentation in such a manner that all of the valuable by-product fermenter gases may be recovered in pure form, uncontaminated by air, oxygen, or nitrogen.

While in the above example of operation I have disclosed what I believe is the most economical and practical method of operating my process, it is obvious that it might be modified in many ways without departing from the object and spirit of the invention. For example it has been already pointed out that various different methods of solvent absorption and of fermenter gas sterilization may be employed in this process and while I have disclosed in each case the method which I prefer, I do not regard my invention as thus limited. Similarly the recovery of solvent vapors may be dispensed with and the solvent laden gas may be sent directly to the gasometer. Similarly one might refrain from sterilizing the fermenter gas returned to the fermenting vessel but this is not to be recommended, as in case a contaminating organism develops in the mash it might be further propagated by such an action.

In the flow sheet drawing only one unit piece of each apparatus is shown. Actually in the operation of this process, one gasometer, one solvent absorption system and one sterilizer and fermenter gas compressor will serve a great number of fermenting vessels.

While in the specific example I have indicated that the gas needed for return to the fermenting vessel is taken from the main body of gas prior to solvent absorption treatment it is obvious that a supply of gas might be obtained directly from the gasometer.

While the preferred method of operation of my process involves the maintenance of the fermenting mash under a natural head pressure, said pressure being developed by the partial confinement of the fermenter gas generated, this form of operation may be departed from without removing the process from the scope of my invention. A great practical advantage in this preferred method of operation lies in the fact that no circulating or "booster" pumps are required to recover the solvent vapors in the gas, the gas passing through the absorption process and into the gasometer under its natural head pressure, though somewhat diminished by friction. However it is possible to insert a circulating pump in the process system to draw off the fermenter gas from the fermenting vessel and pass it along, if such a procedure is desired.

I claim:—

1. A process for the production of butyl alcohol, acetone, and fermenter gas which comprises, displacing fermenter gas in a fermenting vessel by a carbohydrate mash, causing said mash to be fermented by butyl-acetonic bacilli in an atmosphere of fermenter gas, leading off the gas generated by the fermentation, and displacing the fermented mash by fermenter gas.

2. A process for the production of butyl alcohol, acetone, and fermenter gas which comprises, displacing fermenter gas in a fermenting vessel by a carbohydrate mash, causing said mash to be fermented by butyl-acetonic bacilli in an atmosphere of fermenter gas, leading off the gas generated by the fermentation, removing the solvent vapors therefrom, and displacing the fermented mash by fermenter gas.

3. A process for the production of butyl alcohol, acetone, and fermenter gas which comprises, displacing fermenter gas in a fermenting vessel by a carbohydrate mash, causing said mash to be fermented by butyl-acetonic bacilli in an atmosphere of fermenter gas, leading off the gas generated by the fermentation, removing the solvent vapors therefrom, and displacing the fermented mash by sterilized fermenter gas.

4. A process for the production of butyl alcohol, acetone, and fermenter gas which comprises, displacing fermenter gas in a fermenting vessel by a carbohydrate mash, causing said mash to be fermented by butyl-acetonic bacilli in an atmosphere of fermenter gas at a pressure above atmospheric, leading off the gas generated by the fermentation, and displacing the fermented mash by fermenter gas.

5. A process for the production of butyl alcohol, acetone, and fermenter gas which comprises, displacing fermenter gas in a fermenting vessel by a carbohydrate mash, causing said mash to be fermented by butyl-acetonic bacilli in an atmosphere of fermenter gas at a pressure above atmospheric, leading off the gas generated by the fermentation, removing the solvent vapors therefrom, and displacing the fermented mash by fermenter gas.

6. A process for the production of butyl alcohol, acetone, and fermenter gas which comprises, displacing fermenter gas in a fermenting vessel by a carbohydrate mash, causing said mash to be fermented by butyl-acetonic bacilli in an atmosphere of fermenter gas at a pressure above atmospheric, leading off the gas generated by the fermentation, removing the solvent vapors therefrom, and displacing the fermented mash by sterilized fermenter gas.

7. A process for the production of butyl alcohol, acetone, and fermenter gas which comprises, displacing fermenter gas in a fermenting vessel by a carbohydrate mash, causing said mash to be fermented by butyl-acetonic bacilli in an atmosphere of fermenter gas at a pressure above atmospheric, leading off the gas generated by the fermentation and removing the solvents therefrom by water scrubbing and by solid absorbents, and displacing the fermented mash by sterilized fermenter gas.

8. In a process for the production of butyl alcohol, acetone, and fermenter gas by the butyl-acetonic fermentation of carbohydrates, the step which consists in displacing the fermented mash in the fermenting vessel by fermenter gas.

9. In a process for the production of butyl alcohol, acetone, and fermenter gas by the butyl-acetonic fermentation of carbohydrates, the step which consists in displacing the fermented mash in the fermenting vessel by fermenter gas at a pressure above atmospheric.

In testimony whereof I affix my signature.

WILLIAM J. EDMONDS.